Jan. 29, 1957 R. G. EDGERTON 2,779,218
DRILL DEPTH STOP
Filed Aug. 9, 1955
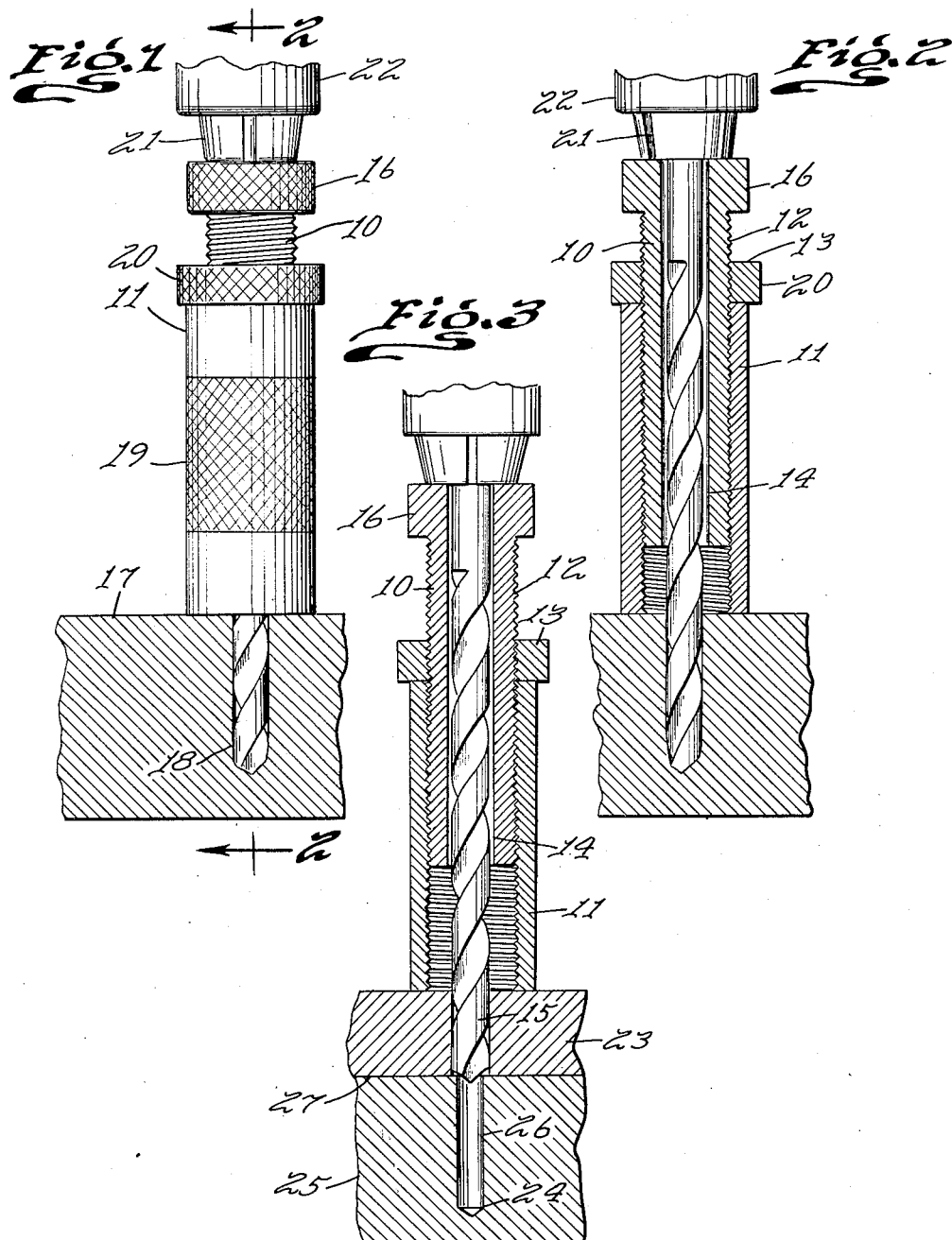
INVENTOR.
Roy G. Edgerton
BY Victor J. Evans & Co.
ATTORNEYS

United States Patent Office 2,779,218
Patented Jan. 29, 1957

2,779,218

DRILL DEPTH STOP

Roy G. Edgerton, Miami, Fla.

Application August 9, 1955, Serial No. 527,289

1 Claim. (Cl. 77—55)

This invention relates to stops and limiting devices particularly adapted for use on drill bits of portable drills, drill presses, hand actuated braces, and other devices used for driving drill bits, augers, and other boring tools used for drilling or boring holes, and in particular, a cylinder with a threaded outer surface bored to receive a drill bit and having a knurled head, and also having a spacing sleeve with a knurled section in the outer surface and a lock nut threaded thereon.

The purpose of this invention is to provide an adjustable drill depth stop that is adapted to be used over a drill bit without being attached to the bit.

Various types of limiting devices and stops have been used in combination with drill bits and the like, however, where such devices use set screws, such as provided in set collars and the like, the stops or limiting devices turn with the drill bit and mar surfaces with which they come in contact. The set screws of such devices also engage cutting edges of drill bits and unless such devices are very carefully set the surfaces and cutting edges of the bits are damaged. With this thought in mind, this invention contemplates a complete cylinder having a knurled head at one end adapted to be slipped over a drill bit and a spacing sleeve threaded on the outer surface of the cylinder whereby with the sleeve retained in position on the cylinder by a lock nut the device is adapted to be held between the thumb and forefinger of a hand as the drill is started into the work and upon reaching the depth desired the device positively stops the drill.

The object of this invention is, therefore, to provide a device or tool, independent of a drill bit, that surrounds or encompasses the drill bit in which the amount the drill bit cuts into material is readily adjustable.

Another object of the invention is to provide a stop for a drill bit in which holes of varying sizes may be drilled on the same center with a small hole, adapted to be threaded, extended from a larger hole wherein the larger hole is adapted to form a bearing to permit freedom of movement of one piece of material in relation to another.

Another important object of the invention is to provide a limiting device for a drill bit in which parts of the limiting device are secured together providing a composite unit and in which the device is adapted to be used without marring material being drilled.

A further object of the invention is to provide a drill depth stop adapted to be freely positioned on drills in which the stop is of a simple and economical construction.

With these and other objects and advantages in view, the invention embodies a cylinder having a knurled head and a threaded outer surface, a spacing sleeve having a knurled section on the outer surface threaded on the cylinder and a lock nut having a knurled outer surface and also threaded on the cylinder for retaining the spacing sleeve in adjusted positions on the cylinder.

Other features and advantages of the invention will appear from the following description, taken in connection with the drawing, wherein:

Figure 1 is a side elevational view illustrating the improved drill depth stop showing an end of a drill extended from the stop in a piece of material, the piece of material being shown in section.

Figure 2 is a vertical section through the improved drill depth stop, taken on line 2—2 of Figure 1, the drill and chuck in which the drill is held being shown in elevation.

Figure 3 is a vertical section similar to that shown in Figure 2 illustrating the use of the device for drilling holes of different sizes on the same center and showing a drill bit stopped by the device after drilling a larger hole in an outer piece of material.

Referring now to the drawing, wherein like reference characters denote corresponding parts, the improved drill depth stop of this invention includes a cylinder 10, an internally threaded sleeve 11 threaded on a threaded outer surface 12 of the cylinder 10 and a lock nut 13 also threaded on the outer surface of the cylinder 10 and adapted to engage the end of the sleeve 11 to lock the sleeve in position on the cylinder.

The cylinder 10, which is provided with a bore 14 for receiving a drill bit, as indicated by the numeral 15, is provided with a knurled head 16 to facilitate gripping the cylinder by the thumb and forefinger of a hand and with the parts assembled as shown in the drawing the stop is adapted to be held by the thumb and forefinger of a hand as a drill is started into work, such as a piece of material 17, and with the sleeve 11 adjusted so that the end of the drill bit extends a desired distance beyond the end of the sleeve holes, such as the hole 18, may be drilled to a constant depth or to different depths as may be desired.

The sleeve 11 is provided with a knurled section 19 on the outer surface and the lock nut 13 is also provided with a knurled outer surface, as indicated by the numeral 20.

By turning the sleeve 11 on the threaded outer surface of the cylinder 10, the distance between the lower ends of jaws 21 of a chuck 22 to the extended end of the sleeve 11 is readily adjustable whereby the end of the drill extended beyond the sleeve is adapted to be set to a predetermined dimension.

When it is desired to drill holes of different sizes on the same center, the sleeve is adjusted whereby the end of the drill is adapted to extend through a piece of material, as indicated by the numeral 23, and after this hole is drilled, the drill bit is removed and replaced by a bit of a smaller diameter and the sleeve 11 set whereby the drill of the smaller diameter may extend downwardly to a point 24 in a piece of material 25 so that an opening 26 may be drilled. The opening 26 leaves sufficient material for threads so that a shoulder screw adapted to provide a pivot for the bar or plate 23 may be threaded into the member 25 with a shoulder at the end of the thread engaging a surface 27 of the member 25 whereby the member 23 is adapted to pivot on the smooth part of the screw or bolt with the shoulder limiting the movement of the head of the screw to prevent binding.

The cylinder, sleeve, and lock nut may be provided in different sizes to accommodate drill bits of different diameters and the length of the parts may also be varied as may be desired.

A plurality of drill depth stops of this design may be supplied in a case to provide a set of each assembly of a different diameter or of a different length.

The collar forming the head 16 on the end of the cylinder 10 may be formed in different patterns or may be omitted, as desired.

It will be understood that modifications, within the scope of the appended claim, may be made in the design and arrangement of the parts without departing from the spirit of the invention.

What is claimed is:

In a depth stop for a drill, a cylinder provided at one end with a knurled portion, the remaining portion of said cylinder being provided with a threaded outer surface throughout its length, said threaded portion being of the same outside diameter throughout its entire length, an internally threaded sleeve arranged in threaded engagement with the threaded outer surface of said cylinder, said sleeve being threaded throughout its entire length, said sleeve being hollow so as to define therein a cylindrical bore, said bore being of the same diameter throughout its entire length, a lock nut threaded on the outer surface of the cylinder and adapted to engage the end of the sleeve for locking the sleeve in position on the cylinder, said cylinder being provided with a bore for receiving a drill bit in non-contacting relationship, the cross sectional area of said lock nut being greater than the cross sectional area of said sleeve, said knurled portion adapted to coact with the jaws of a drill chuck to limit downward movement of the drill, the cross sectional area of said knurled portion being less than the cross sectional area of said lock nut, said sleeve being provided with a knurled section on the outer surface thereof, said lock nut being also provided with a knurled outer surface so that by turning the sleeve on the threaded outer surface of the cylinder, the end of the drill bit can be set to a predetermined position.

References Cited in the file of this patent

UNITED STATES PATENTS 2,529,988     Zempel _____ Nov. 14, 1950

FOREIGN PATENTS 22,542     Denmark _____ Oct. 11, 1917